United States Patent [19]
Morbieu

[11] Patent Number: 5,136,607
[45] Date of Patent: Aug. 4, 1992

[54] SENSOR FOR DETECTING A PHYSICAL MAGNITUDE COMPRISING A MECHANICAL RESONATOR

[75] Inventor: Bertrand Morbieu, Valence, France

[73] Assignee: Sextant Avionique, France

[21] Appl. No.: 658,971

[22] Filed: Feb. 21, 1991

[30] Foreign Application Priority Data

Feb. 27, 1990 [FR] France .................................. 90 02402

[51] Int. Cl.$^5$ .............................................. H01S 3/08
[52] U.S. Cl. ........................................ 372/92; 372/98; 372/109; 372/28
[58] Field of Search ....................... 372/92, 26, 28, 98, 372/109

[56] References Cited

U.S. PATENT DOCUMENTS 4,701,929 10/1987 Baer et al. ............................. 372/27

Primary Examiner—Leon Scott, Jr.
Attorney, Agent, or Firm—Rosenman & Colin

[57] ABSTRACT

A sensor is disclosed for detecting a physical magnitude, comprising a mechanical resonator, adapted to be subjected to a mechanical stress representative of the magnitude to be measured, and means for causing the resonator to oscillate and maintaining its oscillations at a resonance frequency representative of the magnitude to be measured, wherein the resonator is made from a solid laser material and said oscillation means comprise means for feeding the laser resonator with a continuous pumping light beam.

12 Claims, 1 Drawing Sheet

SENSOR FOR DETECTING A PHYSICAL MAGNITUDE COMPRISING A MECHANICAL RESONATOR

BACKGROUND OF THE INVENTION

1. Field of the Invention

The present invention relates to sensors for detecting a physical magnitude comprising a mechanical resonator which is caused to vibrate and to which a stress is applied representative of the magnitude to be measured.

2. Description of Related Art

In sensors of this type, the resonance frequency of the resonator varies as a function of the stress which is applied thereto, measurement of this resonance frequency being representative of the physical magnitude to be measured which may be in particular a pressure, an acceleration, a temperature.

Traditionally, the resonator is made from a piezoelectric material with electrodes fed at the resonance frequency, an automatic control maintaining this resonance.

Sensors of the above defined type have the combined advantages of great stability and high accuracy and they are used particularly in the aeronautics field and mainly for measuring pressures which are parameters to be taken into account for determining the flight parameters of an aircraft, necessary for piloting it.

The evolution of aeronautics techniques has led to an increase in the number of such sensors which are distributed at different positions on the aircraft, as close as possible to the pressure take-off and their information is transmitted by electric connections to the user means, for example an on-board computer.

The major disadvantage of this type of sensor, with electric internal operation principle and electric connection resides in their susceptibility to electromagnetic radiation, from the simple parasite which disturbs the information to lightning or an electromagnetic pulse (IEM) which may cause destruction of the vital parts of the aircraft and this is mainly the case for the new generations of electric flight control apparatus.

To overcome this drawback, a number of constructions for replacing the electric conductors by optical fibers have already been proposed, thus making it possible to offset the control and measurement means in the aircraft, particularly the electric oscillation circuit of the resonator and to provide total galvanic isolation for the sensor.

Thus, it is known to associate an electro-optical transmitter with a traditional electric sensor for transmitting the information.

It is also known to remotely feed the sensor. The electric energy required for operating a sensor comes from light energy transformed by a photodiode and transmitted by a first optical fiber. The measurement signal, after transformation by an emissive diode, is itself transmitted by a second optical fiber.

It is further known to use directly an optical fiber as sensor means, this being for example the case in microcurvature sensors.

These latter solutions have however the drawbacks of leading to high performance but complex sensors and involving in any case an electric implementation of the resonator, or to sensors having low metrological qualities making them incompatible with the performances required.

The Applicant has already proposed, in a French patent application not yet published, exciting the resonator by photo-thermal effect, obtained by a light beam from an emissive diode, thermo-elastic coupling, such as taught by the article "Electronics Letters", Apr. 29, 1982, vol 18, n. 3, pages 381, 382, transforming the thermal energy into a stress causing the resonator to vibrate and detection of the resonance frequency being based on the principle of bi-refringence, after a detection light beam, not modulated at emission, has passed through the resonator and the analysis of which is effected by an opto-electronic transducer. Photo-elastic or photo-acoustic resonators of this latter type could equip a sensor network. However, the resonators of the network could not be excited simultaneously without having in particular separate oscillation electric circuits, i.e. one for each sensor.

The present invention, which aims at providing a resonator satisfying all the above recalled requirements is based on the slightly different concept of a photo-acoustic oscillator introduced in the article by R. M. Longdon and D. L. Dowe "Photoacoustic oscillator sensors", Proc. SPIE Conf., Fibre Optic Sensors II, The Hague, 1987, pages 867–893. It is taught therein to form a Fabry Perot optical cavity between a face of the resonator and the output of an optical fiber, the movement of the resonator in the field of standing waves prevailing in the optical cavity causing modulation of the intensity of the light radiation which, in its turn, maintains the oscillations of the resonator.

However, such a resonator has the further drawback of requiring relative positioning of the resonator and fiber which must be extremely precise.

SUMMARY OF THE INVENTION

These remarks being made, the Applicant proposes then a sensor for detecting a physical magnitude, comprising a mechanical resonator, adapted to be subjected to a mechanical stress representative of the magnitude to be measured, and means for causing the resonator to oscillate and maintaining its oscillations at a resonance frequency representative of the magnitude to be measured, characterized by the fact that the resonator is made from a solid laser material and said oscillation means comprise means for feeding the laser resonator with a continuous pumping light beam.

The resonator of the sensor of the present invention may oscillate by itself under the action of continuous light excitation alone—i.e. a self oscillating photo-elastic resonator—and thus a network of sensors of the invention may be organized, with offset excitation and measurement means and which satisfy the above mentioned requirements.

Functionally, the continuous pumping light beam, of a given wavelength, causes a laser effect in the resonator and so the random emission of relaxation oscillations at a given pseudo-period, i.e. a pseudo-periodic noise. By photo-elastic coupling this noise causes triggering and causes the resonator to vibrate, which modulates the laser effect. The modulation acts on the resonator to maintain its oscillations which, by elasto-optical coupling, react on the laser material to modulate the laser effect. It is a question of an automatic control inside the resonator : the sensor of the present invention integrates a self sustained oscillator. When the resonator oscillates, it emits by laser effect a flux modulated in intensity at the mechanical resonance frequency characterizing the magnitude to be measured.

Preferably, the continuous light beam is fed to the resonator by an optical fiber and focussing means.

Preferably again, the axis of the continuous light beam is perpendicular to the vibration plane of the resonator.

If it is a resonator of the type described in the document FR-A-2 574 209, with flexional vibrating beam and comprising decoupling inertia blocks adjacent the fixing ends of the beam, it is preferable for the continuous beam to be focussed in the vicinity of one of the inertia blocks, where the thermal stress produces maximum deformation.

Still preferably, the material of the resonator is an aluminium and yttrium garnet crystal (YAG) doped with neodyme (Nd) and a continuous beam is emitted by a pumping laser diode tuned to a transition of the absorption band of the $Nd^{3+}$ ion.

Advantageously, the resonator is covered with dichroic dielectric deposits localizing the laser effect.

BRIEF DESCRIPTION OF THE DRAWINGS

The invention will be better understood from the following description of a preferred but non limitative embodiment of the sensor of the invention, with reference to the accompanying drawings in which.

DESCRIPTION OF THE PREFERRED EMBODIMENT

Figure 1:
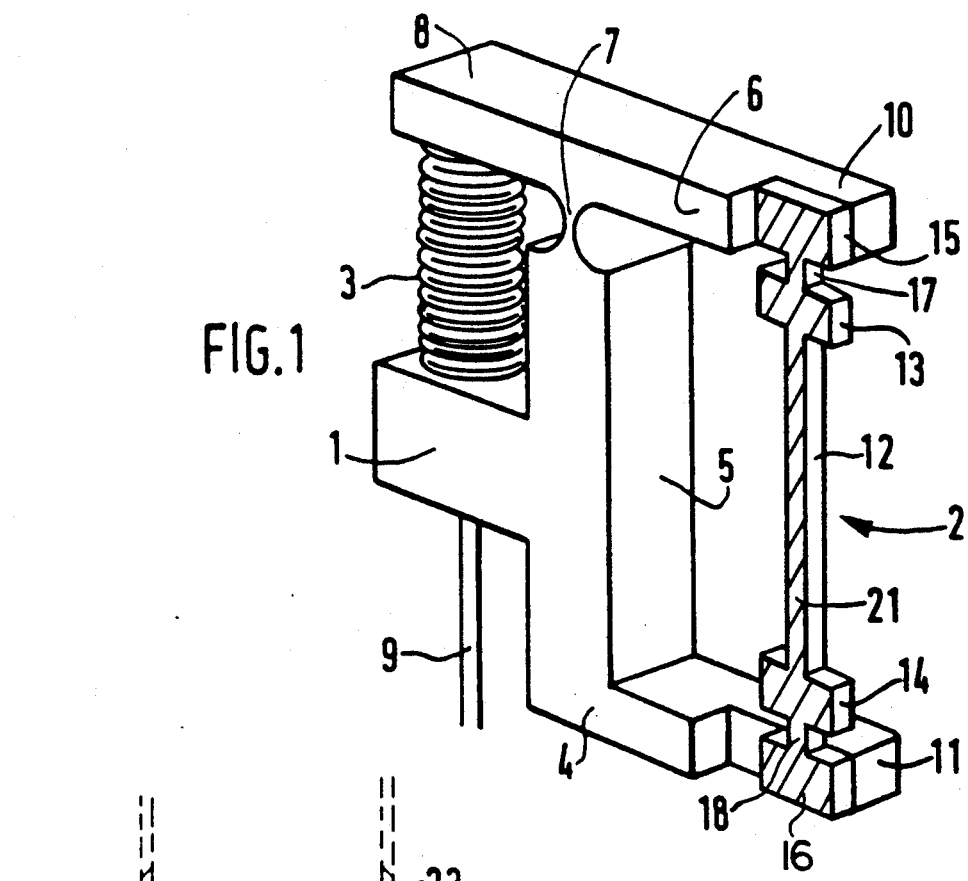
FIG. 1 is a perspective view of the sensor of the invention.

The sensor comprises a frame 1, supporting a laser resonator 2 and a bellows 3. The frame 1 is here formed of a base 4, a bracket 5 and an arm 6 articulated by a hinge 7 to the bracket 5. The resonator 2 is fixed, here by bonding, to one 10 of the ends of arm 6 and to the free end 11 of base 4, the other end 8 of arm 6 being fast with the bellows 3 which is subjected, through a duct 9, to the action of a pressure to be measured.

The resonator 2 used here is a resonator with beam or blade 12 vibrating under flexion, comprising at both ends of the beam two decoupling inertia blocks 13, 14 joined respectively to the two fixing ends 15, 16 bonded to the frame by flexible articulations 17, 18. From the point of view of form, this resonator is perfectly described in the document FR-A-2 574 209.

The resonator is here formed of an Nd doped YAG laser crystal cut out by ultrasonic means. The useful faces of the resonator, those of beam 12, are the face 19, hidden in FIG. 1, called output face extending in the bonding plane of the frame and the opposite face 20, called input face, receiving a pumping beam. Their parallelism, which is determinant for obtaining the laser effect has been checked by interferential methods. These two faces are covered with thin dichroic dielectric layers 21, 22, respectively, for forming a laser cavity. In the sensor example effectively produced by the Applicant, the characteristics of these layers, depending on whether they are used as input face or output face, are given in the table below, R being the coefficient of reflection, T the coefficient of transmission and λ the laser effect emission (1064 nm) or optical fiber (809 nm) wavelength :

|  | λ nm | R % | T % |
| --- | --- | --- | --- |
| Input face | 1064 | 99.9 + 0.5 |  |
|  | 810 |  | 90 |
| Output face | 1064 | 99.7 |  |
|  | 810 |  | 5 |

Figure 2:
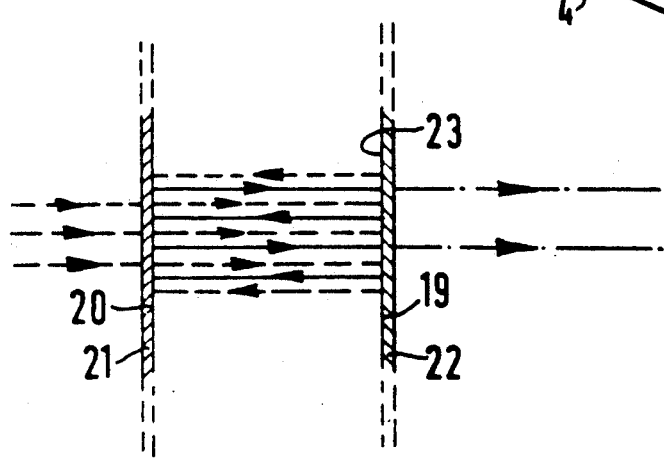
FIG. 2 is a sectional view of a portion of the vibrating beam of the resonator of the sensor of FIG. 1.
Figure 3:
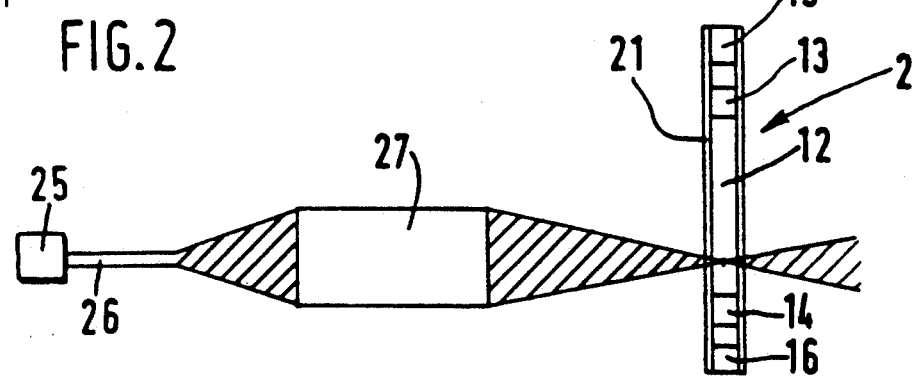
FIG. 3 shows the diagram of the pumping equipment of the least cavity of the resonator.

Referring to FIG. 2, which illustrates schematically the paths of the pumping beam with broken lines and of the laser emission beam with a continuous line for the pumping beam, the dielectric layer 21 covering face 20 is transparent in one direction, that of the radiation emitted by the pumping source and in the other direction, reflecting just like the dielectric layer 22 covering face 19, so as to confine the pumping energy as much as possible in the crystal, the pumping beam not being a useful component of the output beam. For the laser beam, the two dielectric layers 21, 22 are very reflecting so that the laser radiation is confined in the cavity and may be amplified there. The output face 23 of layer 22 must however and naturally let a part of the laser radiation pass, shown with a chain-dotted line in FIG. 2.

The dielectric layer 21, deposited on face 20 of the YAG beam 2, receives then an incident pumping beam emitted by a laser diode 25, of a wavelength adjusted to a transition of an absorption band of the laser medium, in this case 809 nm, here conveyed by an optical fiber 26 coupled to the diode and focussed by an index gradient lens 27. The YAG beam 2, placed in the right direction is positioned so that the focussing spot is situated in the crystal, close to the edge, and here in the vicinity of the inertia block 14 so as to have the maximum energy and, preferably, so that the input face 20 of the resonator is perpendicular to the pumping beam and so that the cavity is pumped longitudinally. Positioning may be made by means of micrometric tables and a binocular. It will be noted that the index gradient lens could be omitted if the laser diode were against the crystal, in which an index gradient will then be created for confining the radiation.

By way of example, in the above described sensor, the vibrating beam of the resonator has a length of 4 mm and a thickness of 0.6 mm. Lens 27 is at a distance of 1 mm from fiber 26 and of 1.75 mm from beam 12.

What is claimed is:

1. A sensor arrangement for detecting a mechanical force indicative of a physical parameter having a magnitude to be measured, comprising:

(a) a vibratory laser resonator constituted of a solid laser material and having opposite faces bounding a laser cavity therebetween;

(b) oscillation means for vibrating the laser resonator, including means for continuously pumping an input light beam to the laser resonator to effect lasing in the laser cavity, and for maintaining the laser resonator vibrating at a resonance frequency; and (c) means for applying the mechanical force indicative of the parameter magnitude to the laser resonator to change the resonance frequency thereof, said change in resonance frequency being indicative of the force.

2. The sensor arrangement as claimed in claim 1, wherein the pumping means includes a laser diode operative for emitting the input light beam having a frequency tuned to a transition of an absorption band of the laser material, and optical means for directing the input light beam from the laser diode to the laser resonator.

3. The sensor arrangement as claimed in claim 2, wherein the laser material is an aluminum and yttrium garnet crystal doped with neodymium.

4. The sensor arrangement as claimed in claim 2, wherein the frequency of the input light beam is tuned to the transition of the absorption band of a neodymium ion.

5. The sensor arrangement as claimed in claim 2, wherein the opposite faces include an input face and an output face in mutual parallelism, and wherein the optical means includes a focusing lens for focusing the input light beam to a focused spot within the laser material between the input and output faces.

6. The sensor arrangement as claimed in claim 2, wherein the optical means further includes an optical fiber extending between the laser diode and the focusing lens.

7. The sensor arrangement as claimed in claim 1; and further comprising a support having spaced-apart arms, and wherein the laser resonator is an elongated beam having opposite end regions fixed respectively to the arms.

8. The sensor arrangement as claimed in claim 7, wherein the opposite faces lie in respective planes in mutual parallelism and are covered with dichroic dielectric layers.

9. The sensor arrangement as claimed in claim 7, wherein the faces include an input planar face and an output planar face, and wherein the pumping means includes means for directing the input light beam in a direction generally normally of the input planar face.

10. The sensor arrangement as claimed in claim 7, wherein the laser resonator has decoupling inertia blocks respectively spaced away from the opposite end regions of the beam, and flexible joints, each located between a respective opposite end region of the beam and a respective inertia block.

11. The sensor arrangement as claimed in claim 10, wherein the pumping means includes means for directing the input light beam to the laser resonator in the vicinity of one of the inertia blocks.

12. The sensor arrangement as claimed in claim 7, wherein one of the arms is hingedly mounted on the support, said one arm having one end fixed to one of the end regions of the beam, and an opposite end; and wherein the applying means includes a duct for conveying a pressurized fluid, and a bellows having one bellows end connected to the duct and an opposite bellows end connected to said opposite end of said one arm, and wherein the bellows expands and contracts in response to the pressurized fluid to move said one arm.

* * * * *